(12) United States Patent
Wark

(10) Patent No.: US 9,221,608 B2
(45) Date of Patent: Dec. 29, 2015

(54) METHOD AND APPARATUS FOR INSTALLING WEAR-RESISTANT LINER PLATES

(71) Applicant: Rickey E. Wark, Spring, TX (US)

(72) Inventor: Rickey E. Wark, Spring, TX (US)

( * ) Notice: Subject to any disclaimer, the term of this patent is extended or adjusted under 35 U.S.C. 154(b) by 87 days.

(21) Appl. No.: 13/947,163

(22) Filed: Jul. 22, 2013

(65) Prior Publication Data

US 2015/0024230 A1   Jan. 22, 2015

(51) Int. Cl.
| | | |
|---|---|---|
| E02D 35/00 | (2006.01) | |
| B65G 11/16 | (2006.01) | |
| B66C 1/66 | (2006.01) | |
| F16B 41/00 | (2006.01) | |
| F16B 45/00 | (2006.01) | |

(52) U.S. Cl.
CPC ............... *B65G 11/166* (2013.01); *B66C 1/66* (2013.01); *F16B 41/002* (2013.01); *F16B 45/00* (2013.01)

(58) Field of Classification Search
CPC ....... B65G 11/166; B65G 11/026; B66C 1/66
USPC ........ 52/125.2, 125.3, 126.3, 122.1; 428/137, 428/596
See application file for complete search history.

(56) References Cited

U.S. PATENT DOCUMENTS

| | | | | |
|---|---|---|---|---|
| 2,144,598 | A * | 1/1939 | Brinckerhoff et al. | 110/336 |
| 2,373,698 | A * | 4/1945 | McGeary et al. | 361/216 |
| 3,019,775 | A * | 2/1962 | Robinson | 122/498 |
| 4,070,835 | A * | 1/1978 | Reverend et al. | 52/235 |
| 4,141,511 | A * | 2/1979 | Anderson | 241/183 |
| 4,376,596 | A * | 3/1983 | Green | 404/35 |
| 4,564,316 | A * | 1/1986 | Hunziker | 405/262 |
| 4,848,681 | A * | 7/1989 | Eriksson et al. | 241/183 |
| 4,913,594 | A * | 4/1990 | Sigourney | 405/285 |
| 4,992,005 | A * | 2/1991 | Hilfiker | 405/284 |
| 5,265,396 | A * | 11/1993 | Amimoto | 52/745.12 |
| 5,456,554 | A * | 10/1995 | Barrett et al. | 405/284 |
| 5,713,695 | A * | 2/1998 | Rogers | 404/25 |
| 5,735,377 | A * | 4/1998 | Herren | 193/33 |
| 5,819,550 | A * | 10/1998 | Saia et al. | 62/239 |
| 6,038,824 | A * | 3/2000 | Hamrick, Sr. | 52/143 |
| 6,279,715 | B1 * | 8/2001 | Herren | 193/33 |
| 6,386,586 | B1 * | 5/2002 | Ulery et al. | 280/762 |
| 7,232,023 | B2 * | 6/2007 | Ellis et al. | 193/2 R |
| 7,837,020 | B2 * | 11/2010 | Pittman | 193/2 R |
| 8,033,069 | B2 * | 10/2011 | Hotchkiss, III | 52/405.3 |
| 8,468,765 | B1 * | 6/2013 | Kim | 52/506.06 |
| 8,485,336 | B2 * | 7/2013 | Tenold et al. | 193/33 |
| 2007/0130860 | A1 * | 6/2007 | Paquette et al. | 52/311.1 |
| 2009/0028466 | A1 | 1/2009 | Bailey | |
| 2012/0090953 | A1 * | 4/2012 | Cieplak et al. | 193/2 R |

* cited by examiner

*Primary Examiner* — Basil Katcheves
(74) *Attorney, Agent, or Firm* — Young Basile Hanlon & MacFarlane P.C.

(57) ABSTRACT

Liner plates of mild steel layered over with chromium carbide are provided with a bi-planar spacer clip also acting as a lifting eye on the top surfaces thereof and fasteners such as bolts or studs extending from the exposed planar surface of the mild steel layer. A chain and hook arrangement is used to deliver and locate each liner plate adjacent a wall upon which the liner plates are to be mounted in vertically stacked relationship. The clips serve as spacers between vertically stacked liner plates and the fasteners extend through preformed holes in the wall of the delivery structure. The clips have a notched base portion which receives a weld bead running along the top exposed edge of only the mild steel layer. The clips are left in place after installation and are gradually worn away by ore traveling through the delivery structure.

6 Claims, 3 Drawing Sheets

METHOD AND APPARATUS FOR INSTALLING WEAR-RESISTANT LINER PLATES

FIELD OF THE INVENTION

The invention relates to the field of wear-resistant liner plates for material delivery structures such as ore chutes and also to a method of attaching such plates to a wall or walls of the delivery structure.

BACKGROUND OF THE INVENTION

It is often necessary to line the walls of ore delivery chutes and similar material delivery structures with wear-resistant plates to reduce damage and down time for the delivery structures due to the abrasive action of rocky ore and the like as it passes through the structure. Liner plates can be made of many materials including mild steel covered on the exposed side with a hard, durable material such as chromium carbide. Fasteners such as bolts or studs are typically used to hold the plates against the surfaces to be protected.

SUMMARY OF THE INVENTION

In accordance with the present invention, liner plates are mounted on delivery structure surfaces using edge-mounted spacer clips that also serve as lifting eyes capable of accommodating lifting equipment such as chains with hooks on the end. In addition, fasteners are mounted in predetermined locations on the unprotected sides of the plates. These fasteners extend through holes in the wall or walls on which the plates are mounted.

In accordance with a specific aspect of a preferred embodiment of the invention, spacer clips of a configuration hereinafter described are mounted by welding to the top edge of each plate, care being taken to place the weld only on exposed mild steel where good and safe adherence can be obtained. The plates are lifted into place, the clips serving as spacers between plates in a stack. The clips can be left in place after the liners are attached to the protected walls, since they will eventually wear away as ore passes through the structure. The preferred spacer clip is a unitary structure in two planes, one of which protrudes upwardly and outwardly from the top edge of the liner plate and has an eye (aperture) formed therein to receive a chain hook. The other plane of the spacer is welded to the top edge of the liner plate. In plates having a substantial thickness of carbide or other material which will not accept a good weld, the spacer clip may be notched out to a depth no greater than the thickness of the mild steel plate, thereby to provide a location for laying down a weld bead between the clip and the edge of the mild steel liner plate.

Various advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
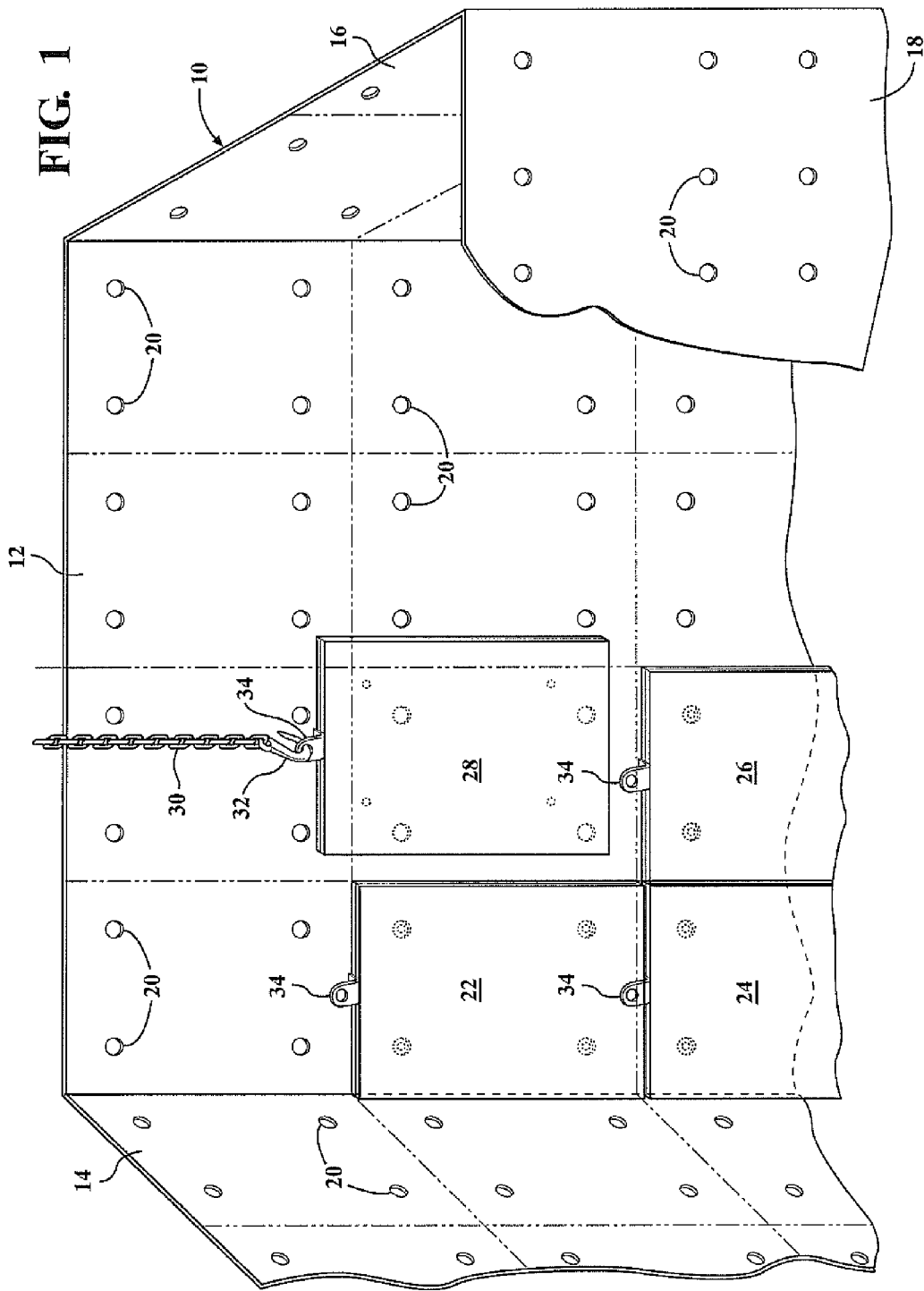
FIG. 1 is a perspective view of part of the interior of an ore delivery chute in which liner plates are being installed.
Figure 2:
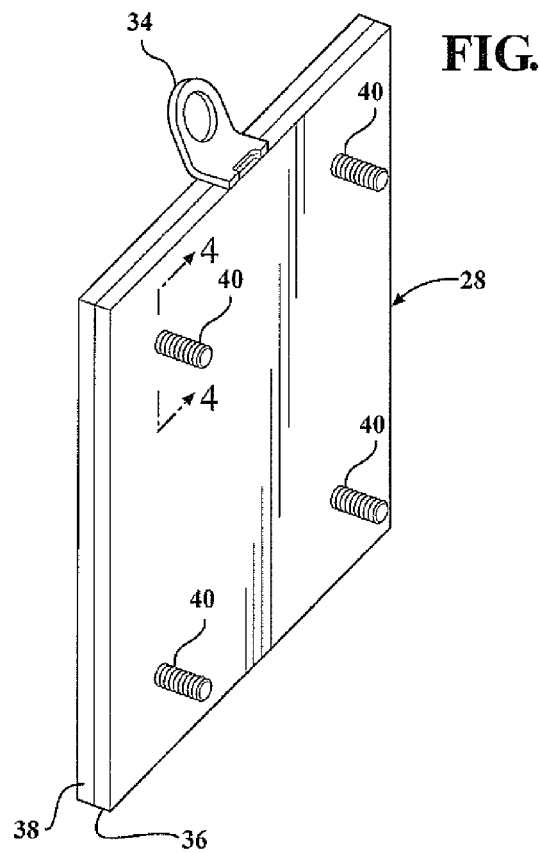
FIG. 2 is a perspective rear view of a finished liner plate ready for installation.
Figure 3:
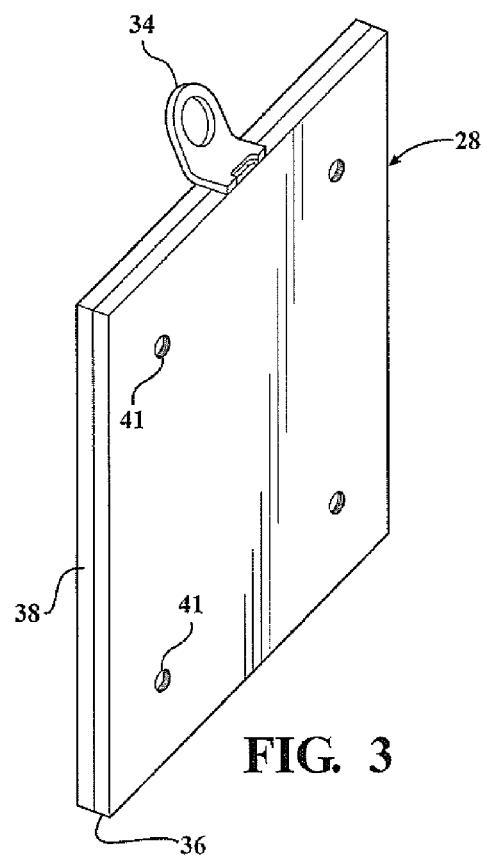
FIG. 3 is a perspective rear view of a plate before studs are attached.

FIG. 1 shows a portion of a generally rectangular and vertical ore chute 10 having a generally planar back wall 12, planar and parallel side walls 14, 16, and a front wall 18 that runs parallel to the rear or back wall 12. Holes 20 are drilled or otherwise formed in the walls 12, 14, 16, 18 in quadrilateral groups of four for purposes to be described. Using those holes to guide fasteners 40, liner plates 22, 24, 26 are installed on the rear wall 12 in vertically stacked and side-by-side relationship with a slight gap between them. In this case, the liner plates 22, 24, 26 are planar so as to conform to and overlie the planar inner surface of the rear wall 12; in the event the wall 12 is curved, then the plates are correspondingly curved to lie against the wall of the chute. A fourth liner plate 28 is in the process of being installed. Plate 28 is being transported by means of a crane (not shown) having a chain 30 with a steel hook 32 attached to the end thereof. The hook 32 has been placed through a steel spacer clip 34 serving at this time as a lifting eye. Clip 34 which has been welded to the top edge of the liner plate 28 in a manner hereinafter described.

Figure 4:
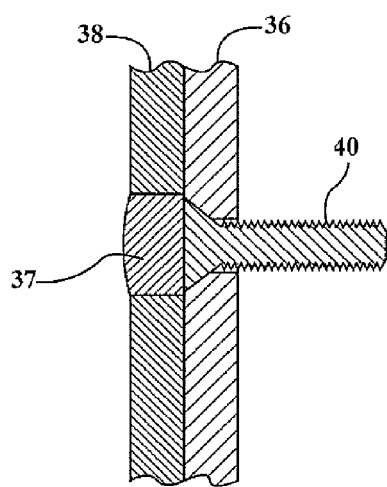
FIG. 4 is a side view in section showing how studs are attached.

As shown in FIGS. 2-7, each liner plate is made up of a planar mild steel plate 36 layered over with chromium carbide 38. The layers 36, 38 are completely co-extensive so as to form continuous and flat top, bottom and side edges and opposite parallel plane surfaces. The fasteners 40 extend orthogonally to the liner plate from the rear surface; i.e., the exposed surface of the mild steel plate layer 36. The studs 40 may be attached to the liner plates in any of several ways; their locations, however, always correspond to the quadrilateral groups of holes 20. For example, fasteners 40 may be threaded steel studs welded to the mild steel plate surface. Alternatively (as shown in FIG. 4) fasteners 40 may be bolts extending through the liner plates. In FIG. 4, the bolt hole is countersunk and the hole in the carbide layer has been filled with weld material 37. In any case, the locations of the fasteners correspond to the quadrilateral arrangement of the holes 20 in the walls 12, 14, 16, 18 of the ore chute 10. The holes are made slightly larger than the diameter of the fasteners 40 so as to provide a tolerance, as will be apparent to those skilled in the mechanical arts.

Figure 5:
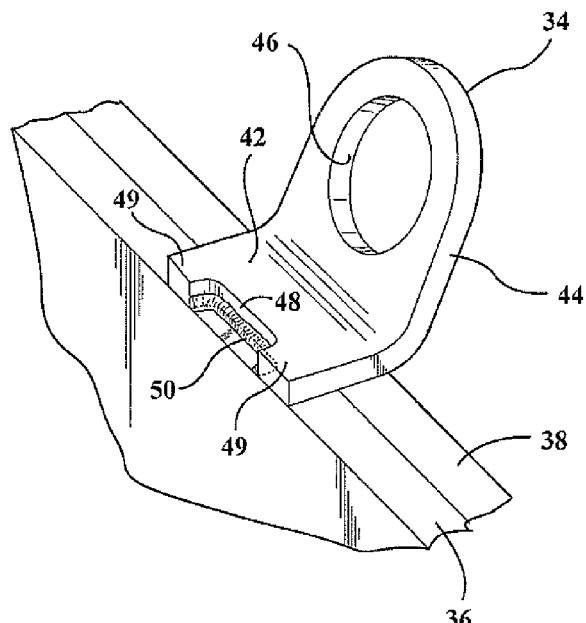
FIG. 5 is a detail of an installed lifting eye.
Figure 6:
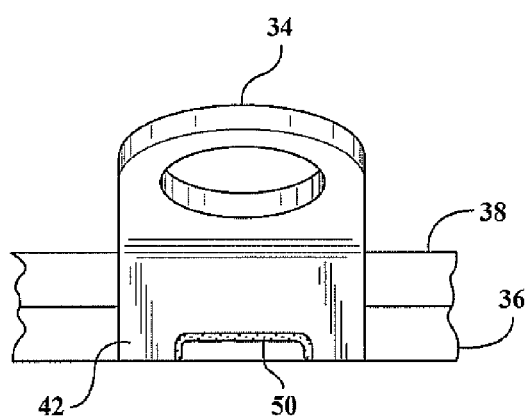
FIG. 6 is a top view of an installed lifting eye.
Figure 7:
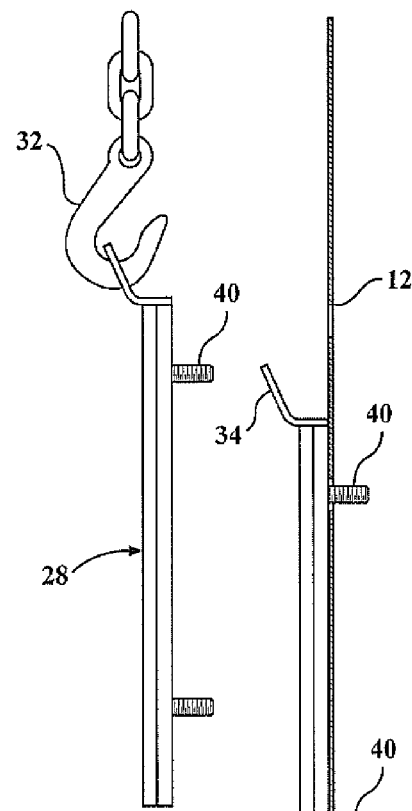
FIG. 7 is a side view of a chute wall with two plates installed and a third plate being installed.

Each spacer clip 34 is made of mild steel and is configured in such a way as to define a base plane 42 that can overlie both top edge surfaces of the layers 36, 38 as best shown in FIG. 5. Each clip 34 also comprises an integral ring portion 44 having an aperture 46 formed therein to receive a lifting hook 32. The included angle between the plane of the upwardly and outwardly extending clip portion 44 and the base portion 42 is approximately 115°. The base portion 42 is notched out at 48 to define two spaced apart legs 49 which sit on the top edge of the mild steel layer 36. A weld bead 50 is placed within the notched area 48 to join the spacer 34 only to the top edge surface of the mild steel layer 36; i.e., there is no weld between the clip 34 and the top edge of the chromium carbide surface layer 38 because it is generally considered impossible to effectively weld to carbide. A typical liner plate constructed in accordance with this disclosure can weigh anywhere between 40 and 200 pounds and the spacer clips 34 are constructed so as to be capable of tolerating the probable load. The exemplary clips shown are 2.25 inches wide and made of 10 gauge mild A36 steel.

In the installation process, the first step is to size and shape the liner plate to the wall of the delivery structure upon which it is to be mounted. The fasteners may be pre-attached to the plates 40 so as to correspond in location and size to mounting holes 20 which are formed in the interior wall of the delivery structure in which the liner plates are to be mounted. Alternatively, fasteners may be put in place after the plates are located adjacent the wall to be protected. The clip 34 is attached across the co-extensive upper edges of the layers 36, 38 of the liner plate by laying down a weld bead 50 between the legs 49 as well as between the notched-out area of the clip and the top edge surface of the mild steel layer 36. The weld does not extend into the carbide layer 38. The next step is to lift and transport the liner plate 28 by bringing the plate in close proximity to the wall 12 upon which the plate 28 is to be mounted and aligning the fasteners 40 with the holes 20 in the wall 12. If another liner plate is already in place, the liner plate 28 being installed is being lifted over the inclined planar portion 44 of the spacer of the next lower liner plate and the fasteners 40 are then pushed through the holes in the delivery chute wall. Although not shown in the figure, nuts and, where needed, washers are applied to the exposed threaded surfaces of the fasteners to complete the installation. Additional liner plates are located as described above until a vertical stack is completed and then the next stack is started, and the process continues until all of the liner plates 28 have been installed and the walls are completely protected.

It will be noted that each of the clips 34 serve as a spacer between vertically stacked liner plates. Therefore, the thickness of the clip, especially the lower plane 42, is critical to proper spacing between plates. Moreover, it will be observed from the foregoing description and from the drawing that the clips remain in place after the liner plates 28 have been installed. Because the clips 34 are made of a soft or mild steel, they will be gradually worn away after the delivery structure has been put to use.

The angular relationship between the portions 42 and 44 of the clips facilitates the stacking of one liner plate 28 on top of another. While the outside included angle of 65° may not be critical, an angle approaching 90° is generally to be avoided.

Summarizing, each liner plate 28 exhibits top, bottom and side surfaces as well as parallel, opposite surfaces. Fasteners 40 are attached in such a way as to extend in a predefined pattern from the exposed surface of the mild steel layer 36, the pattern of the fasteners corresponding to the pattern of preformed mounting holes in the delivery structure in which the liner plates are to be installed. The clips 34 made of mild steel are attached to the top edges of the liner plates but only welded to the exposed top edge of the mild steel layer despite the fact that they extend forwardly over the exposed top edge of the chromium carbide layer 38. The liner plates are lifted with a chain and hook arrangement, the hook being directed through the eye 46 of the lifting eye from front to back, so that the hook may be easily removed from the lifting eye 46 after the studs have been placed within the mounting holes of the protected structure. The lifting eyes 34 are left in place and are gradually worn away as the structure is put into service.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A liner plate for attachment to an interior wall of a material delivery structure comprising:
    a first plate forming a first layer of mild steel having a top edge and a bottom edge;
    a second plate forming a second layer of a wear-resistant material of substantially the same dimensions and shape as the first plate and having a top and a bottom edge, wherein at least the top edge is adjacent and co-planar with the top edge of the first plate;
    the first and second plates being co-extensively bonded together to form a unitary two-layer plate structure having an exposed surface of mild steel on one side and an exposed surface of said wear-resistant material on the other side;
    a pattern of fasteners attached to and extending from the exposed surface of the mild steel layer; and
    a spacer attached to the first plate proximate the top edge and secured by welding only to the mild steel layer.

2. The liner plate as defined in claim 1 wherein the spacer is a lifting ring.

3. A liner plate as defined in claim 2 wherein the spacer has two integral but angularly spaced planar portions, one portion having spaced apart coplanar tabs with a relieved area between the tabs, the other portion having a hole formed therein to define a lifting ring.

4. A liner plate as defined in claim 3 wherein the spacer is welded to the top edge of the mild steel layer in the relieved area between said tabs.

5. A liner plate as defined in claim 1 wherein the first layer contains a carbide.

6. A liner plate as defined in claim 1 wherein the liner plate is essentially planar and rectangular.

* * * * *